Jan. 24, 1928.
C. L. BEST
1,656,899
TRACKLAYING TRACTOR
Filed March 24, 1923      2 Sheets-Sheet 1
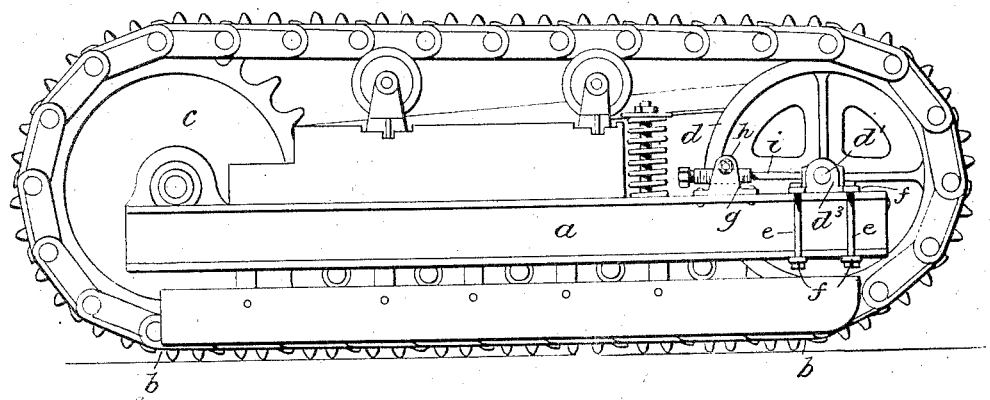
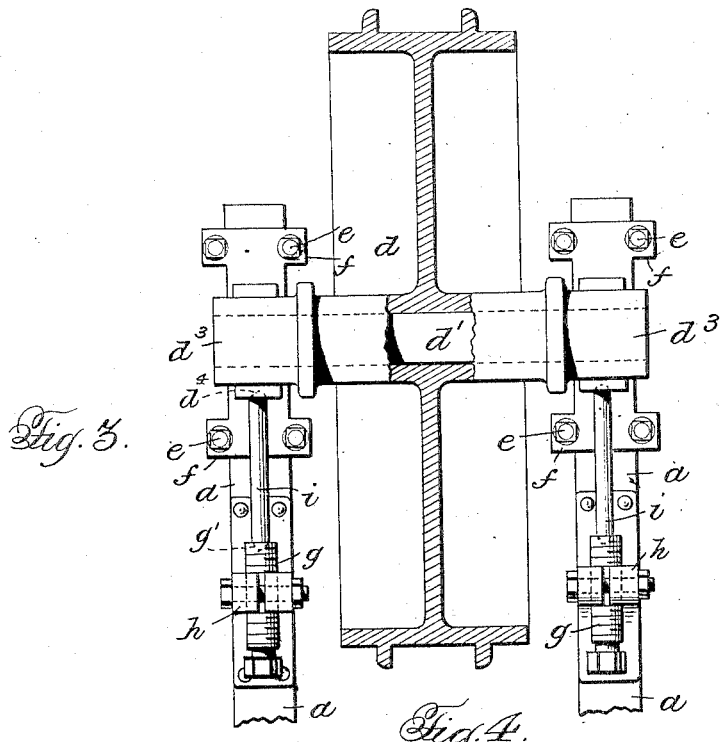
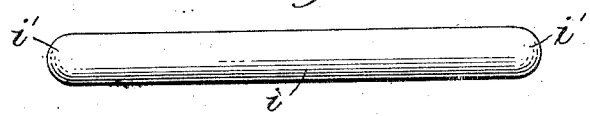
Inventor:
Clarence Leo Best,
Witness:
Jas. E. Hutchinson
By Miland & Miland
Attorneys

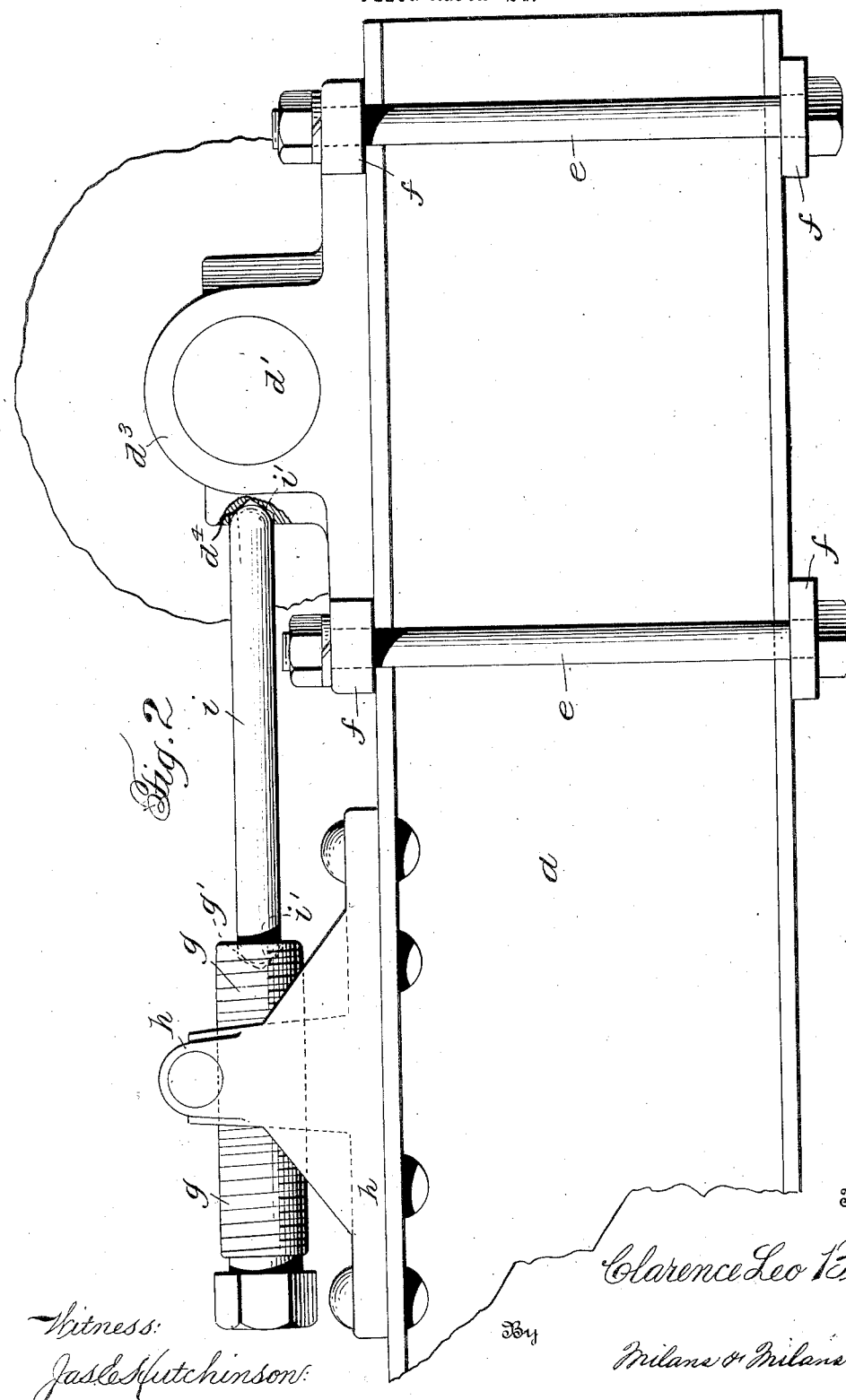

Patented Jan. 24, 1928.

1,656,899

UNITED STATES PATENT OFFICE.

CLARENCE LEO BEST, OF SAN LEANDRO, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA.

TRACKLAYING TRACTOR.

Application filed March 24, 1923. Serial No. 627,278.

This invention relates to improvements in track laying tractors, and more especially to an improved safety device and idler adjustment therefor.

In the operation of track laying tractors over sandy soil, gravel or sticky mud, the sprocket wheels often become plugged with dirt. The accumulation in the bottom of the sprockets becomes so hard packed or caked and built up that tremendous tension is put on the tracks, causing disengagement of the tracks from the wheels and the bending up of the heavy truck frame channels resulting in serious damage, putting the machine out of operative condition, and requiring considerable time and work for repairs.

The object of the present invention is to provide improved means of a simple efficient nature that while serving to hold the front idler bearing firmly fixed in its adjusted position under normal conditions, will yield or give way when the track is subject to undue strain, permitting the idler wheel bearing to move back and relieve the parts of strain without serious damage, and providing for the quick readjustment of the parts to working position.

The invention, with other objects and advantages thereof, and the particular construction, combination and arrangement of parts comprising the same, will be understood from the hereinafter contained detail description, when considered in connection with the accompanying drawings, forming part hereof, and illustrating one embodiment of the invention.

In the drawings:

Figure 1 is a side elevation of a tractor truck equipped with safety adjusting and holding means in accordance with the present invention.

Fig. 2 is a detail side elevation of the safety adjusting and holding means for the idler bearing.

Fig. 3 is a detail plan of the safety idler adjusting and holding means.

Fig. 4 is a detail view of one of the yieldable members of the safety adjusting and holding means.

The invention comprehends means for adjusting and holding the bearing of the front wheel or idler surface of the tractor truck including a rod member adapted to be interposed between a part on the truck frame and the idler bearing, and adapted to yield when the tread is subjected to excessive strain. More particularly the invention contemplates a rod or piece of metal adapted to be interposed between and detachably interfit at its ends with one end of an adjusting screw and with the idler bearing, and adapted under undue pressure to buckle or bend and permit the idler bearing to move relatively to the frame and relieve the parts of strain.

While in the drawings is illustrated a preferred embodiment of the invention, which has proven satisfactory in practice, it will of course be understood that minor changes and variations in the particular construction shown, and the embodiment of the invention in other forms, as will appeal to those skilled in the art and falling within the scope of the appended claims, may be practiced without departing from the spirit of the invention.

In the drawings, the invention is shown applied to one of the well known forms of tractor trucks the same comprising spaced parallel channels $a$, and endless treads $b$, a rear driving sprocket $c$ and a front idler surface or wheel $d$, the latter having an axle $d'$ mounted in bearings $d^3$ on the channels $a$. $e, f$, designate respectively sets of bolts and plates of conventional form for clamping the idler bearing $d^3$ to the truck frame channels $a$.

The particular embodiment of my improved safety idler adjusting and holding means illustrated in the drawings, comprises a horizontally extending adjusting screw $g$ having a threaded engagement with a fixed upstanding part or bracket $h$ on one of the channels $a$, and a yieldable member in the form of a metal rod or piece $i$ adapted to be interposed between and have a detachable interfitting engagement at its ends with one end of the adjusting screw $g$ and the idler bearing $d^3$, the adjusting screw $g$ and the idler bearing $d^3$ being shown provided respectively with seats or depressions $g'$, $d^4$ for the end portions of the metal rod or piece $i$. As shown there are a pair of such adjusting screws $g$ and yieldable rods $i$, one adjusting screw and yieldable rod being associated with each of the channels $a$ and one end portion of the idler bearing $d^3$ at either side of the idler $d$.

The metal rods or pieces $i$ are of a predetermined strength or rigidity sufficient to hold the idler bearing $d^3$ in adjusted position under ordinary operating conditions, and adapted when the tread $b$ is subjected to excessive strain, as when the sprockets of the wheels $c$, $d$, become plugged with dirt, to buckle or bend, permitting the idler bearing $d^3$ and the idler $d$ to move back so that the tread and other parts are relieved of strain.

The yieldable members, rods or pieces $i$ may be constructed of any suitable material. In the construction shown, the yieldable members $i$ are constructed of three quarter inch cold rolled steel, and said members or rods have tapering end portions $i'$, the depressions or seats $g'$, $d^4$, of the adjusting screw $g$ and the idler bearing $d^3$ also being correspondingly tapered as shown.

In the use of my improved safety idler adjustment and holding means, the yieldable rods or pieces $i$ are engaged with the adjusting screws and the idler bearing, and the adjusting screws are then turned up to properly adjust the idler bearing and tighten the tread, the sets of clamp bolts $e$ being then tightened to clamp the idler bearing to the channels $a$, and as will be understood the track can be tightened, from time to time as desired through the adjusting screws. Under normal operative conditions the idler bearing will be held in adjusted position by the clamp bolts and plates $e$, $f$, and the adjusting screws $g$ and the rods or pieces $i$ but should the tread $b$ be subjected to excessive strain, the rods or pieces $i$ will bend or buckle and permit the idler bearing to move back and relieve the parts of strain. When this occurs, after the caked dirt has been chiseled out or freed from the sprockets of the wheels, the bent rods or pieces $i$ are removed, straightened, and used over again, or new pieces may be substituted therefor, the truck mechanism being quickly readjusted.

It will be noted that by the special construction and arrangement of parts hereinbefore set forth, means of a simple efficient nature is afforded for adjusting and holding the idler bearing in position under normal operative conditions, and which at the same time functions as a safety device or protector for the mechanism whereby bending up of the truck frame channels when the sprockets become caked with dirt and expensive repairs and loss of time incident thereto, are entirely avoided.

What I claim is:

1. In a track laying tractor, a truck frame, an endless tread, a driving sprocket and an idler for the tread, a journal bearing on the frame for the idler, and means for holding the said idler bearing in place on the frame, said means including a part on the frame, and a rigid member engaging said frame part and the idler bearing, said member being of predetermined strength to hold the idler bearing in fixed position under normal operating conditions and adapted to yield under excessive strain.

2. In a track laying tractor, a truck frame, an endless tread, a driving sprocket and an idler for the tread, a journal bearing on the frame for the idler, and means for holding said idler bearing in place on the frame, said means including a part on the frame, an adjusting screw having an adjustable threaded engagement with said frame part, and a rod interposed between and having its opposite end portions interfitting with one end of said adjusting screw and with a portion of the idler bearing, said rod being of predetermined strength to hold the idler bearing in fixed position under normal operating conditions and adapted to yield under excessive strain.

3. In a track laying tractor, a truck frame, an endless tread, a driving sprocket and an idler for the tread, a journal bearing on the frame for the idler, and means for holding the idler bearing in place on the frame, said means including a part on the frame, an adjusting screw having an adjustable threaded engagement with said frame part, and a rod interposed between the adjusting screw and the journal bearing said rod being of predetermined strength to hold the idler bearing in fixed position under normal operating conditions and adapted to yield under excessive strain, said adjusting screw at one end and the idler bearing each being provided with a socket adapted to receive one end portion of the rod.

In testimony whereof I hereunto affix my signature.

CLARENCE LEO BEST.